(12) United States Patent
Pierson

(10) Patent No.: US 6,470,686 B2
(45) Date of Patent: Oct. 29, 2002

(54) SYSTEM FOR CHILLING INLET AIR FOR GAS TURBINES

(76) Inventor: Tom L. Pierson, 7910 Arbor Hill Ct., Sugarland, TX (US) 77479

(*) Notice: Subject to any disclaimer, the term of this patent is extended or adjusted under 35 U.S.C. 154(b) by 0 days.

(21) Appl. No.: 09/961,711

(22) Filed: Sep. 24, 2001

(65) Prior Publication Data

US 2002/0017095 A1 Feb. 14, 2002

Related U.S. Application Data

(63) Continuation of application No. 09/369,788, filed on Aug. 6, 1999, now Pat. No. 6,318,065.

(51) Int. Cl.[7] .............................................. F02C 3/00
(52) U.S. Cl. ........................................... 60/772; 60/728
(58) Field of Search ..................... 60/772, 728; 62/175, 62/332

(56) References Cited

U.S. PATENT DOCUMENTS 1,781,541 A * 11/1930 Einstein ....................... 62/110
5,632,148 A * 5/1997 Bronicki et al. .............. 60/728
5,758,502 A * 6/1998 Utamura ....................... 60/728

OTHER PUBLICATIONS

Ondryas, et al., "Options in Gas Turbine Power Augmentation Using Inlet Air Chilling," presented at the Gas Turbine and Aeroengine Congress and Exposition, Jun. 11–14, 1990, Brussels, Belgium.

* cited by examiner

*Primary Examiner*—Ehud Gartenberg
(74) *Attorney, Agent, or Firm*—Moser, Patterson & Sheridan, L.L.P.

(57) ABSTRACT

In a gas turbine power plant system having an air chiller for lowering the temperature of inlet air, a compressor for compressing the inlet air, a combustor for combusting the compressed air and fuel and a power turbine for providing useful power, a method and apparatus for chilling water delivered to the air chiller is provided, having a thermal water storage tank for storing chilling water, the tank having a bottom portion and a top portion, and a bottom inlet and a bottom outlet and a top inlet and a top outlet. A charge cycle is provided wherein the tank is filled with chilled water, and a discharge cycle is provided wherein the chilled water is fed to the air chiller, thereby chilling the inlet air to the power turbine.

11 Claims, 3 Drawing Sheets

SYSTEM FOR CHILLING INLET AIR FOR GAS TURBINES

This is a continuation of application Ser. No. 09/369,788 filed on Aug. 6, 1999 now U.S. Pat. No. 6,318,065.

BACKGROUND OF THE INVENTION

1. Field of the Invention

This invention relates broadly to cooling inlet air to a gas turbine. In a specific embodiment, the invention relates to an apparatus and method for storing water in a thermal storage tank, and using the stored water to cool the inlet air to a gas turbine, 2. Description of the Related Art A conventional gas turbine system includes: an air compressor for compressing the turbine inlet air; a combustion chamber for mixing the compressed air with fuel and combusting the mixture, thereby producing a combustion gas; and a power turbine that is driven by the combustion gas, thereby producing an exhaust gas and useful power.

Over the years, various technologies have been employed to increase the amount of useful power that the power turbine is able to produce. One way of increasing the power output of a gas turbine is to cool the turbine inlet air prior to compressing it in the compressor. Cooling causes the air to have a higher density, thereby creating a higher mass flow rate through the turbine. The higher the mass flow rate through the turbine, the more power the turbine produces. Cooling the turbine inlet air temperature also increases the turbine's efficiency.

Various systems have been devised for chilling the inlet air to the compressor. One such system uses evaporative cooling, wherein ambient temperature water is run over plates or over a cellular media inside of a chamber, thereby creating thin films of water on each plate, or on the media. The turbine inlet air is then drawn through the chamber, and through evaporative cooling, the air is cooled to near the wet bulb temperature. This system is limited to cooling the air to the wet bulb temperature, which is dependent upon the atmospheric conditions at any given time. Another system uses a chiller to chill water that is then run through a coil. The inlet air is then drawn through the coil to cool the air. This system requires parasitic power or steam to drive the chilling system which has the further drawback that when inlet air cooling is needed the most, i.e. during the day when the temperature is the highest, is also the time when power demand from the turbine is the highest, i.e. during the day when power users are in operation. In order to run the chiller, power from the turbine is required, but this power is needed by the users of the turbines power. On the other hand, when cooling is needed the least, i.e. at night when the temperatures are the lowest, surplus power from the turbine is available because the consumers of the turbine's power are largely not in operation. Accordingly, a continuing need exists for a turbine inlet air cooling system which: would efficiently cool turbine inlet air; would take advantage of surplus power available during times of low consumer power demand; and would not drain the system of power during times of high consumer power demand.

SUMMARY OF THE INVENTION

The claimed invention may be directed to a method for chilling inlet air to a gas turbine power plant, which may include: providing a system of circulating chilling water including a chilling system; providing an inlet air chiller for lowering the temperature of the inlet air being fed to a gas turbine compressor through heat transfer between the circulating chilling water and the inlet air, providing a thermal water storage tank which is operably connected to the system of circulating chilling water, the thermal water storage tank containing chilling water having a bottom; during a charge cycle, removing a first portion of chilling water from the thermal water storage tank, passing the removed first portion of water through the chilling system to lower the temperature of the removed first portion of water and to provide a chilled removed first portion of water, and then introducing the chilled removed first portion of water into the thermal water storage tank at a point proximate the bottom of the tank, wherein the chilled removed first portion of water is introduced to the tank in an amount sufficient to lower the average temperature of the chilling water in the thermal water storage tank; and during a discharge cycle, chilling the inlet air by removing a second portion of chilling water from the thermal water storage tank, from a point proximate the bottom of the tank and then passing the second portion of chilling water to the inlet air chiller to make heat transfer contact between the second portion of chilling water and the inlet air, such that the temperature of the inlet air is lowered.

In one specific embodiment of the claimed method, the average temperature of the chilling water in the tank may be lowered to about 33° F. to about 40° F. during the charge cycle and may be raised to about 60° F. to about 70° F. during the discharge cycle. In another specific embodiment, the times of the charge and discharge cycles may be such that, before the temperture of the chilling water proximate the bottom of the tank reaches about 36° F. during the discharge cycle, the charge cycle is initiated. In another specific embodiment of the method for chilling inlet air, the first portion of chilling water removed from the thermal water storage tank during the charge cycle may be removed through a top outlet. In yet another specific embodiment, the second portion of chilling water removed from the thermal water storage tank during the charge cycle may be removed through a bottom inlet. In yet another specific embodiment, the chilling water in the tank may have an average temperature that can be lowered during the charge cycle and raised during the discharge cycle. In a further specific embodiment of the claimed method, the discharge cycle may be carried out during the night-time and the charge cycle may be carried out during the day-time. In still another specific embodiment, the water level in the tank may remain substantially constant during the charge and discharge cycles. In still a further specific embodiment, the one or more chillers may be deactivated during the discharge cycle. In another specific embodiment, the discharge cycle may occur during peak power usage of the gas turbine power plant. In another specific embodiment, the discharge cycle may be performed after the removing of at least a portion of the volume of chilling water from the thermal water storage tank during the charge cycle, such that the chilled removed water that is introduced into the thermal water storage tank at a point proximate the bottom of the tank may remain substantially at the point proximate the bottom of the tank. In another specific embodiment, the first portion of chilling water removed during the charge cycle may be sufficient to chill substantially all of the water in the thermal water storage tank to a temperature below the temperature of maximum water density. In yet another specific embodiment of the claimed method, the second portion of chilling water removed during the discharge cycle may be substantially all of the chilling water in the tank. In a further specific embodiment of the method of the present invention, the thermal water storage tank contains a volume of chilling water that is sufficient to lower the temperature of the inlet air to a range of from about 45° F. to about 55° F. for a period of between about 4 hours to about 12 hours.

The present invention is also directed to a method of chilling water delivered to the air chiller in a gas turbine power plant system having at least one air chiller for lowering the temperature of inlet air, at least one air compressor for compressing the inlet air, at least one combustor for burning the compressed air and providing combustion gas, and at least one power turbine driven by the combustion gas for producing useful power, a method of chilling water delivered to the air chiller, the method including the steps of: providing the at least one air chiller with an air chiller inlet that may receive water, and an air chiller outlet that may expel water; providing a thermal water storage tank, having a bottom portion, a top portion, at least one bottom opening proximate the bottom portion and at least one top opening proximate the top portion, and containing a volume of stored water having an average temperature, and temperature of maximum water density; performing a charge cycle, by introducing through the at least one bottom opening a first quantity of chilled water which has a chilled water temperature that is below the temperature of maximum water density, thereby lowering the average temperature of the volume of stored water, wherein the first quantity of chilled water being introduced through the bottom opening is sufficient to lower the average temperature of the volume of stored water to a temperature that is below the temperature of maximum water density; and performing a discharge cycle by removing a second quantity of chilled water from the tank through the at least one bottom opening and passing the second quantity of chilled water to the air chiller inlet, to lower the temperature of the inlet air, thereby raising the temperature of the second quantity of chilled water and providing high temperature water, then introducing the high temperature water to the at least one top opening in the tank.

In one specific embodiment of the method of chilling water, the temperature of maximum water density may be about 39.2° F. In another specific embodiment, the temperature of the stored water may have a temperature of from about 34° F. to about 40° F. In yet another specific embodiment of the claimed method the temperature of the stored water may have a temperature corresponding to the maximum water density of about 39.2° F. In another specific embodiment sodium nitrate may be added to depress the freezing temperature of the water thereby allowing stored water to be in the range of about 25° F. to about 34° F. In another specific embodiment of the method of the present invention, the useful power produced by the power turbine may be consumed at a variable rate, and the charge cycle may be performed when the rate is at a minimum. In a further specific embodiment, the useful power produced by the power turbine may be consumed at a variable rate, and the discharge cycle may be performed when the rate is at a maximum. In yet another specific embodiment of the method of the present invention, the quantity of water expelled during the discharge cycle may be less than the volume of stored water. In a further specific embodiment, the quantity of chilled water may be chilled by passing water through at least one chiller. In still another specific embodiment of the claimed method, the temperature of inlet air may be lowered from a high temperature of from about 85° F. to about 95° F. to a low temperature of from about 45° F. to about 55° F. In still a further specific embodiment, the high temperature may be about 90° F. and the low temperature may be about 50° F. In yet another specific embodiment, the output of the gas turbine power plant system may be from about 50 megawatts to about 250 megawatts.

The present invention is also directed to a gas turbine power plant system, wherein the system includes: one or more air chillers for lowering the temperature of inlet air; one or more air compressors for compressing the inlet air; one or more combustors for burning the compressed air and providing combustion gas; and one or more power turbines driven by the combustion gas for producing useful power, and an improvement that may include: a thermal water storage tank for containing chilled water, wherein the thermal water storage tank has a bottom portion with a bottom outlet and a top portion, and the tank is operably connected to the air chiller such that the chilled water passes from the bottom outlet to the air chiller to lower the temperature of the inlet air and is returned to the thermal water storage tank; and a water chilling system for chilling the water in the thermal water storage tank, wherein the water chilling system is configured to receive high temperature water from the top portion of the tank, and wherein the system is configured to introduce low temperature water to the bottom portion of the tank, such that the average temperature of the water in the tank is lowered; and wherein the water chilling system includes one or more chillers for lowering the temperature of the high temperature water from the top portion of the tank to provide low temperature water.

In one specific embodiment of the claimed gas turbine power plant system, the thermal water storage tank may have a bottom, and the bottom outlet may be positioned at a height that is less than about 10 feet from the bottom of the tank. In another specific embodiment of the gas turbine power plant system, the thermal water storage tank may have a bottom, and the bottom outlet may be positioned at a height that is less than about 5 feet from the bottom of the tank. In another specific embodiment, the thermal water storage tank may have a bottom, and the bottom outlet may be positioned at a height that is less than about 18 inches from the bottom of the tank. In another specific embodiment, the tank may have a top outlet and a bottom inlet such that, in a charge cycle the high temperature water may be removed through the top outlet and may be fed to the one or more chillers, and the low temperature water may be introduced to the tank through the bottom inlet. In a further specific embodiment of the gas turbine power plant system, the tank may have a bottom outlet such that, in a discharge cycle, chilling water may be removed from the tank through the bottom outlet. In still a further specific embodiment of the gas turbine power plant system, the tank may have a bottom outlet such that, in a discharge cycle, chilling water may be removed from the tank through the bottom outlet, fed to the air chiller and is returned to the tank, bypassing the one or more chillers of the water chilling system. In still a further specific embodiment of the gas turbine power plant system, the top portion may be separated from the bottom portion by a thermocline. In yet another specific embodiment, during the charge cycle, the bottom inlet may receive a quantity of chilled water that is sufficient to supply the air chiller with water having a temperature below the temperature of maximum water density for four or more hours. In another specific embodiment, during the charge cycle, the bottom inlet may receive a quantity of chilled water that is sufficient to supply the air chiller with water having a temperature below the temperature of maximum water density for eight or more hours. In still another embodiment, during the charge cycle, the bottom inlet may receive a quantity of chilled water that is sufficient to supply the air chiller with water having a temperature below the temperature of maximum water density for twelve or more hours. In still another specific embodiment, the thermal water tank may have a height of from about 25 feet to about 70 feet. In yet another specific embodiment, the thermal water tank may have a diameter of from about 50 feet to about 250 feet. In another specific embodiment, the thermal water tank may have a diameter, and a height, and the diameter may be greater than the height. In yet another specific embodiment of the claimed invention, the volume of stored water may be greater than about eight hundred thousand gallons. In still a further specific embodiment, the temperature of the water in the top portion may be about 15° F. to about 35° F. greater than the temperature of the water in the bottom portion. In another specific embodiment, the thermal water storage system may include a plurality of thermal water storage tanks, each of the plurality of tanks may have a bottom inlet and a bottom outlet, and each of the plurality of tanks may have a top inlet and a top outlet. In another specific embodiment, the bottom inlet may have a bottom diffuser, and the top inlet may have a top diffuser, whereby the water entering the bottom inlet is diffused, and the water entering the top inlet may be diffused. In yet another specific embodiment, the temperature of the water in the top portion of the tank may have a temperature ranging from about 60° F. to about 70° F. In still a further specific embodiment, the temperature of the water in the bottom portion of the tank may have a temperature that is above the freezing temperature. In another specific embodiment, the water chilling system may include at least one mechanical chiller. In still another specific embodiment of the present invention, the water chilling system may include at least one absorption chiller. In still a further specific embodiment, the water chilling system may include at least one mechanical chiller and at least one absorption chiller. In yet another specific embodiment, the mechanical chiller may receive chilled water from the absorption chiller, and the mechanical chiller may further chills the chilled water. In another specific embodiment, the gas turbine power plant system may additionally including a heat recovery steam generator and a steam turbine, wherein the absorption chiller may be driven by steam from the heat recovery steam generator. Another specific embodiment of the gas turbine power plant system may additionally include a heat recovery steam generator and a steam turbine, wherein the absorption chiller is driven by back pressure from the steam turbine exhaust. In another specific embodiment, the inlet air may be lowered from a first temperature of about from 85° F. to about 95° F. to a second temperature of from about 45° F. to about 55° F. in the inlet air chiller. In yet another embodiment, the first temperature may be about 90° F. and the second temperature may be about 50° F. In another specific embodiment of the gas turbine power plant system, the chilling water being fed to the inlet air chiller may have a temperature of from about 34° F. to about 40° F. In another specific embodiment, the gas turbine power plant system may additionally include a steam turbine and a heat recovery steam generator, and the heat recovery steam generator may receive exhaust gas from the power turbine and may provide high pressure steam to the steam turbine, and the steam turbine may provide low pressure steam.

DETAILED DESCRIPTION OF THE INVENTION

Specific embodiments of the invention will now be described including a preferred system (apparatus and method), referring to attached FIG. 1. All references to the "invention" below are intended to be directed to the specific embodiments and not necessarily, in limiting fashion, to the broad invention in the claims.

Figure 1:
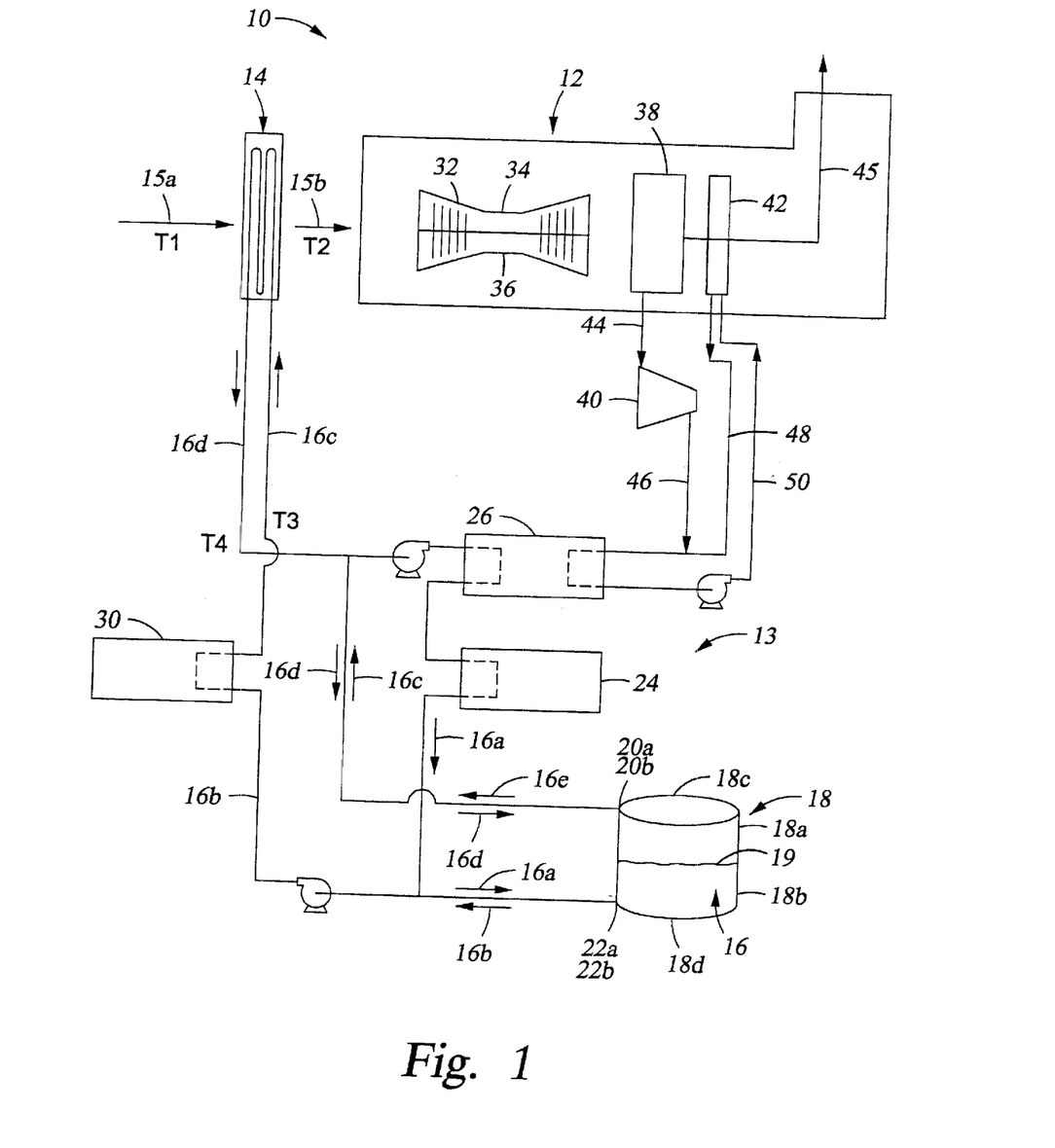
FIG. 1 is a schematic diagram of the turbine inlet air cooling system of the present invention.

Generally, referring to FIG. 1, the overall apparatus 10 includes a conventional gas turbine system 12 having an air chiller 14, e.g., a conventional cooling coil, for lowering the temperature of inlet air, shown schematically by arrow 15a, from ambient temperature (T1, e.g., about 90° F. (about 32° C.), or in the range of from about 70° F. (about 21° C.) to about 85° F. (about 29° C.) to a range of from about 100° F. (about 38° C.) to about 115° F. (about 47° C.)) to provide compressor feed air, shown schematically by arrow 15b, having some lower temperature (T2, e.g., about 50° F. (about 10° C.), or in the range of about 45° F. (about 7° C.) to about 55° F. (about 13° C.)). The air chiller 14 can be a conventional cooling coil that provides for heat transfer contact, e.g., across a set of coils within the air chiller 14, between the circulating chilling water 16c (preferably at a T3 of about 34° F. (or about 1° C. to about 2° C.) to about 40° F. (or about 4° C. to about 5° C.)) and the inlet air 15a, forming chilled compressor feed air 15b, and resulting in a higher temperature circulating water 16d (T4, e.g., about 54° F. (about 12° C.) to about 60° F. (about 16° C.)). A preferred cooling coil may be specially circuited so as to achieve relatively high changes in the temperature of the water flowing through the tubes in the cooling coil. This rise in temperature is preferably in a range of about 20° F. (about 11° C.) to about 35° F. (about 19° C.) on a hot design day. As used herein a "design day" is the maximum temperature that the ambient air is expected to reach—the temperature upon which the system design is based. The chilled compressor feed air 15b may then be introduced to a conventional gas turbine (GT) compressor 32, where it is compressed, combined with fuel and burned in a conventional combustor 34 to produce a combustion gas that can be used for driving the power turbine 36, resulting in "exhaust gas." FIG. 1 shows the overall system as including only one gas turbine system 12, one air chiller 14, one water chilling system 13, and one tank 18. However, depending upon system requirements as well as geographical, geological, and other constraints, it may be desirable to have more than one gas turbine system 12, more than one air chiller 14, more than one water chilling system 13, or more than one tank 18.

Another specific embodiment of the invention is directed to a combined cycle system. There, the exhaust gas from the power turbine 36 can be passed through a heat recovery steam generator (HRSG) 38 to produce steam, shown schematically by arrow 44, and "stack gas," shown schematically by arrow 45. Further, in another embodiment of a combined cycle system, a heat recovery coil 42 may receive the exhaust gas 45 from the power turbine 36 and produce hot water or steam, shown schematically by arrow 48. The hot water or steam 48 produced either by the HRSG 38 or the heat recovery coil 42 may advantageously be used to supply power to an absorption chiller 26, the importance of which will be discussed below.

As mentioned, it is advantageous to lower the temperature of the inlet air 15a to a temperature T2 that is as low as possible. The change in air temperature from T1, before entering the air chiller 14, to T2, after exiting the air chiller 14, is referred to herein as ΔT. Even small increases in ΔT, i.e., lowering T2 can effect significant increases in the capacity of the gas turbine system. For example, in a particular gas turbine, an increase in ΔT of about 2.6° F. (about 1° C. to about 2° C.) may increase the turbine output by about one percent.

An important aspect of the apparatus of this invention is a chilling water system or loop, which includes circulating chilling water 16 that circulates through the specially circuited, high ΔT air chiller 14 and back through chillers piped in series to a thermal water storage tank 18 for storing the chilling water 16. The term "loop" preferably refers to conventional pipage, e.g. pvc or steel pipes having valves (not shown) where appropriate. The features of this chilling water loop will now be described with reference to FIG. 1, where, for ease of comprehension, the water within the loop is referred to generally with numeral 16, and the various streams of water within the loop are referred to with the numeral 16 followed by an alphabetic character to distinguish between various streams of water where necessary.

The chilling water loop includes a water chilling system 13. The water chilling system 13 may include any number of conventional water chillers installed either in parallel or in series but preferably with at least two chillers piped in series so as to stage the temperature drop of the water into an intermediate and a lower temperature chiller. This saves power on the upstream chiller and makes the system more efficient. If the power plant is a combined cycle plant and if there is sufficient exhaust energy available from either the steam turbine exhaust (stream 46) or heat recovery coil (stream 48), then it is preferable as shown in FIG. 1 for the water chilling system 13 include an absorption chiller 26 which may derive its power from the HRSG 38, or the heat recovery coil 42, or both, and a mechanical chiller 24. The absorption chiller 26 and the mechanical chiller 24 are shown in series, as that is the preferred arrangement with the absorption chiller placed upstream of the mechanical chiller, however they may be placed in parallel depending upon system needs. An object of the water chillers is to chill the chilling water 16 to a sufficiently low temperature so that the chilling water 16 can then be used to chill the inlet air 15a in the air chiller 14 with a minimum water flow rate and maximum water ΔT. Preferably, the temperature of the chilling water 16c is about 34° F. (about 1° C. to about 2° C.) to about 40° F. (about 4° C. to about 5° C.) prior to entering the air chiller 14. A number of conventional devices can be used to chill the water going to the water storage tank 18. For example, the chilling water can be chilled before it is ever introduced to the tank, by passing the chilling water 16d from the air chiller either through a mechanical chiller 24 or an absorption chiller 26 (driven by hot water or steam 44, 48 from the HRSG or LP steam 46 coming out of the steam turbine 40) to provide chilling water 16a that is then introduced to the tank 18. A hybrid chilling arrangement can also be used whereby both mechanical 24 and absorption 26 chillers are used in combination. The preferred arrangement is to circulate the warm water 16e from the tank 18 or the heated water 16d from the air chiller 14 to the upstream absorption (or mechanical) chiller 26 first where the water 16d will be chilled from range of about 54° F. (about 12° C.) to about 65° F. (about 19° C.) to a range of about 40° F. (or about 4° C. to about 5° C.) to about 48° F. (or about 8° C. to about 9° C.). The water 16d then circulates through the downstream mechanical chiller 24 where it may be chilled further to about 34° F. (or about 1° C. to about 2° C.) to about 40° F. (or about 4° C. to about 5° C.).

The thermal water storage tank 18 is preferably a thermally insulated vessel, having an upper opening or connection or top inlet/outlet 20. In other specific embodiments, e.g., where an open tank is used, the top "opening" or top inlet can be the open top of the tank, so that water can be piped into the tank through the top. The tank 18 may be made from any material having the strength and insulation qualities necessary for a thermal water storage tank, however, preferably, the tank 18 is constructed of steel or concrete. The top inlet/outlet 20 (also referred to herein as an "opening") both receives heated water 16d from the air chiller 14 during a discharge cycle, and expels heated water 16e during a charge cycle. (The charge and discharge cycles will be explained in further detail below) The thermal water storage tank 18 preferably also has a lower connection or bottom inlet/outlet 22 (or "opening"). The bottom inlet/outlet 22 both receives chilled water 16a from water chilling system 13 during the charge cycle, and discharges chilled water 16b to the air chiller 14 during the discharge cycle. Furthermore, the system shown in FIG. 1 also allows a "partial storage" strategy whereby the chilled water in the tank can be used to supplement the water produced by the chillers such that both can be provided to the air chiller 14 to allow longer periods of on-peak chilled air going to the gas turbine.

In accordance with the invention, the water 16 in the tank 18 is "stratified" according to temperature. That is, the lower temperature water (about 33° F. (about 0° C. to about 1° C.) to about 40° F. (about 4° C. to about 5° C.)) resides at the bottom of the tank. Broadly, the temperature at the bottom of the tank may be in the range of from about 33° F. (about 0° C. to about 1° C.) to about 40° F. (about 4° C. to about 5° C.). Preferably, the temperature of the water in the bottom of the tank is in the range of from about 33° F. (about 0° C. to about 1° C.) to about 36° F. (about 2° C. to about 3° C.). Most preferably the temperature of the water in the bottom of the tank is in the range of from about 33° F. (about 0° C. to about 1° C.) to about 34° F. (about 1° C. to about 2° C.). The higher temperature water (typically about 60° F. (about 16° C.) to about 70° F. (about 21° C.), typically having a lower density, remains at the upper portions of the tank.) Preferably, the entire tank 18 will be occupied by lower temperature water (about 33° F. (about 0° C. to about 1° C.) to about 34° F. (about 1° C. to about 2° C.)) after a charge cycle (discussed below) is completed. The tank should be capable of storing sufficient chilled water 16 to provide air cooling during an entire discharge cycle (discussed below). Further, the tank 18 should have a sufficient height so that adequate temperature gradients can be maintained. Preferably, the diameter of the tank 18 is greater than the height. An advantage of using the charge/discharge cycles, and other features of the present invention is realized with respect to the natural tendency of water to "stratify" according to temperature. Generally, in the temperature range of about 39.2° F. (about 4.0° C.) to about 212° F. (100° C.), water decreases in density as temperature increases. As a result, the colder water sinks to the bottom and the warmer water rises to the top, thereby forming uniform temperature strata or layers. Further, in the temperature range of about 32° F. (about 0° C.) to about 39.2° F. (4.0° C.), water tends to increase in density according to temperature. As a result, in this temperature range, the warmer water tends to sink to the bottom and the colder water rises to the top. Generally, pure water reaches its maximum density at about 39.2° F. (about 4.0° C.). However, depending upon atmospheric conditions, or if various chemicals are added to the water, the temperature of maximum water density may change.

Therefore, if the charge/discharge cycles of the claimed invention are not performed, the coldest water does not sink to the bottom, but instead, water with a temperature of about 39.2° F. (about 4.0° C.) naturally tends to settle toward the bottom of the tank. The tank 18 of the claimed invention discharges warm water 16e from the top portion 18a of the tank 18, and receives chilled water 16a from the water chilling system 13, which is below the temperature of maximum water density, during the charge cycle into the bottom portion 18b through bottom inlet/outlet 22. In this manner, the coldest but not necessarily the heaviest water is forced into the bottom. Further, as mentioned, the charge cycle preferably is long enough and the charge flow rate is great enough to fill the entire tank 18 with the design cold water temperature by the end of the charge cycle. Even if the tank is not chilled with water that is below the temperature of maximum water density (i.e., below about 39.2° F.), the water 16 in the tank 18 is preferably not allowed to remain stagnant in the tank 18 long enough for the densest but not the coldest water to sink to the bottom of the tank 18. During the discharge cycle, water is preferably taken from the bottom portion 18b of the tank 18 through the bottom inlet/outlet 22 thereby ensuring that the coldest water is removed and directed to the air chiller 14. As it is preferable to have the coldest water remain in the bottom portion 18b of the tank 18, and have the warmest water remain in the top portion 18a of the tank 18, it is generally desirable to prevent unnecessary mixing or global movement of the water 16 in the tank 18. For this purpose, a diffuser 23a, 23b (FIG. 3) may be disposed adjacent the bottom inlet/outlet 22 and top inlet/outlet 20. Generally, the diffusers 23a, 23b tend to reduce the velocity of the water entering or leaving the tank to minimize any turbulent mixing.

It may also be advantageous to allow some of the chilled water to flow through the air chiller 14, during the charge cycle, to provide some cooling to the gas turbine. In this manner, the thermal water storage tank 18 will be charged with chilled water, and some cooling of the inlet air can also be accomplished.

Figure 3:
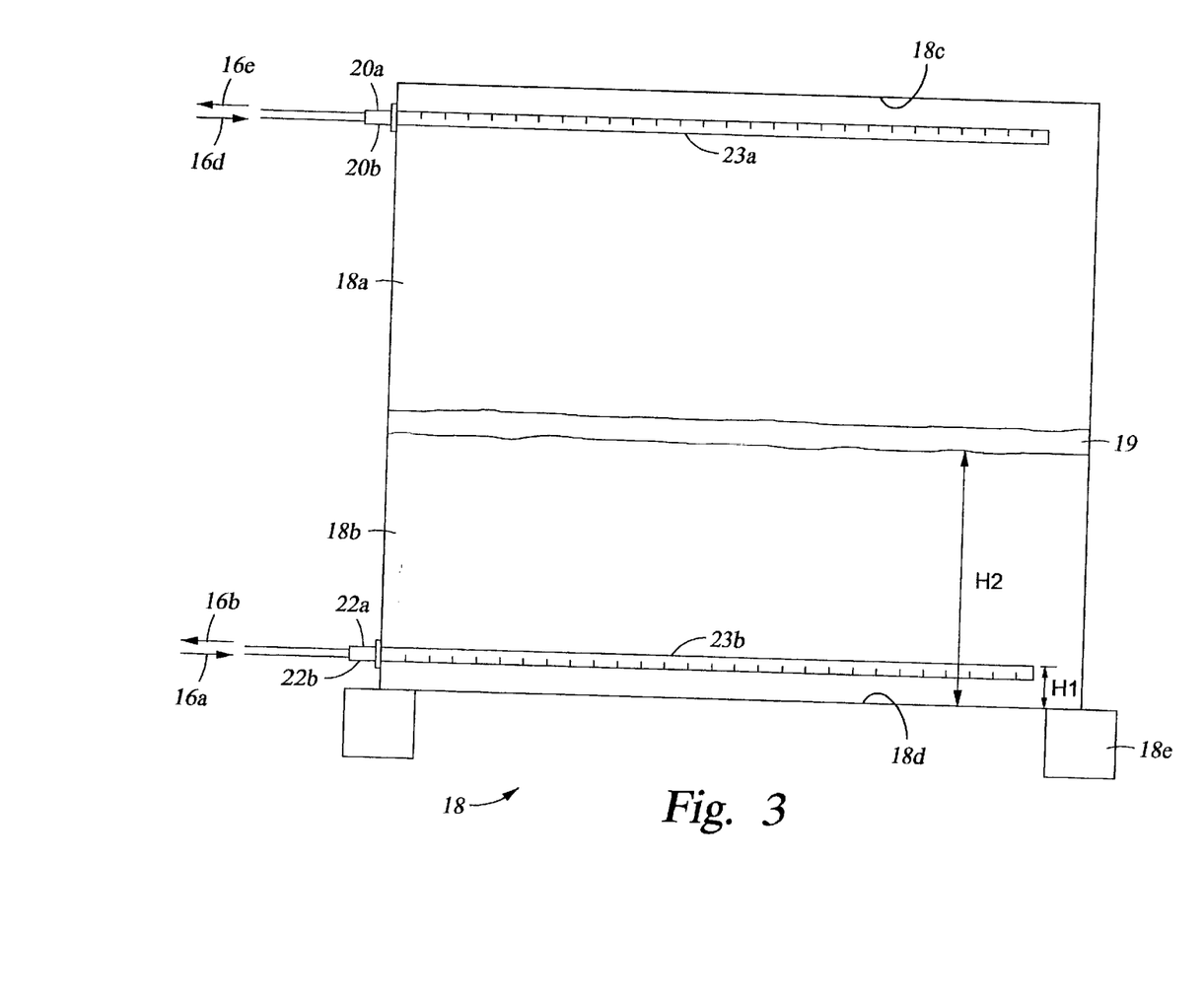
FIG. 3 is a side view of a storage tank used in a specific embodiment of the present invention.

Referring to FIG. 3, a preferred embodiment of the thermal water storage tank 18 will be discussed. The tank has a top 18c, a bottom 18d, and a foundation 18e. Top inlet 20b and top outlet 20a are shown as a single port or connection to the diffuser which is adapted to accommodate a bi-directional flow, i.e. either into the tank, 20b, or out of the tank, 20a. However, it should be noted that top inlet 20b and top outlet 20a may also be two separate ports or orifices, one being an inlet 20b, the other being an outlet 20a. The same is true for bottom inlet 22b and bottom outlet 22a, which are shown as a single ports in FIG. 3. As shown in FIG. 3, top diffuser 23a and bottom diffuser 23b are essentially long pieces of pipe or tubing with slots cut perpendicular to their length. In operation, the slots in top diffuser 23a point toward the top 18c of tank 18, and the slots in bottom diffuser 23b point toward the bottom 18d of tank 18. In this manner, when water flows into one of the inlets 20b, 22b and through the corresponding diffuser 23a, 23b the flowing water generally does not create global currents in the tank. Preferably, the diffusers 23a, 23b prevent mixing of the warmer water in the top portion 18a with the cooler water in the bottom portion 18b. Other diffuser designs may also be used. Some of these designs include octagonal diffusers which are formed by eight straight sections of pipe connected with 45° elbows. A series of equally sized, shaped, and spaced lateral slot openings are cut into the top of the straight sections of pipe in a manner similar to the slots cut in the diffuser shown in FIG. 3. Some diffusers have circular holes rather than slots. Other types of diffusers include radial disk diffusers which consist of two closely spaced disks, mounted parallel to the tank floor. In a radial disk diffuser, the incoming water flows between the disks and enters the tank horizontally.

Also shown in FIG. 3 is the thermocline 19, which is shown as a thin band. The thermocline 19 separates the cold water in the bottom portion 18b of the tank 18 from the warmer water in the top portion 18a. The bottom portion 18b of the tank 18 is that part of the tank 18 that is below the thermocline 19, and the top portion 18a of the tank 18 is that portion of the tank 18 that is above the thermocline 19. As mentioned, the thermocline will move up and down during the charge and discharge cycles respectively. The distance from the bottom 18d of the tank 18 to the thermocline 19 is denoted in FIG. 3 as H2. It is advantageous to position the bottom inlet 22b and the bottom outlet 22a at a height H1 that is below the thermocline 19 at its lowest point at the end of the discharge cycle. In so doing, generally the warmer water above the thermocline 19 should not be expelled out of the bottom outlet 22a to the air chiller 14 during the discharge cycle. In FIG. 3, the height of the bottom inlet 22b and the bottom outlet 22a are signified by H1, but it is to be understood that the bottom inlet 22b and the bottom outlet 22a may be at the same or different heights depending upon the requirements of the specific system. Preferably H2 is maintained at a height that is greater than H1, so that during the discharge cycle, the warmer water in the top portion 18a will not be expelled through the bottom outlet 22b. Generally, the tank 18 is sized, according to parameters described below, so that the height H2 of the thermocline may not fall below a height of less than about 10 feet. More preferably, the design tank size will be reduced such that the height H2 is less than about 5 feet, and most preferably, the tank size will be reduced to where height H2 is only about 18 inches during a complete discharge cycle on a design hot day.

During the discharge cycle, the heated water 16d from the air chiller 14 is introduced into the top portion 18a of the tank 18 through top inlet/outlet 20. This heated water 16d tends to remain above the chilled water 16b. At the level where the heated water meets the chilled water there may be a "thermocline," represented by line 19. A thermocline is a horizontal region that separates higher temperature water from lower temperature water. The bottom portion 18b of the tank 18 is below the thermocline 19 and the top portion 18a is above the thermocline. The bottom inlet/outlet 22 may be disposed at the very bottom 18d of the tank 18. However, the bottom inlet/outlet 22 may alternatively be positioned at any height so long as it is in the bottom portion 18b of the tank 18. Similarly, the top inlet/outlet 20 can be positioned at the very top 18c of the tank 18 but may also be positioned at any place in the top portion 18a of the tank 18. In one embodiment of the claimed invention, the top portion 18a contains water that is in the range of about 60° F. (about 16° C.) to about 70° F. (about 21° C.). In another embodiment, the temperature of the water in the bottom portion 18b is just above freezing temperature, which may vary depending upon atmospheric conditions (such as atmospheric pressure), or if chemicals are added to the water. Preferably, the water in the tank is pure water. However, the claimed invention contemplates the addition of various chemicals or other additives to the water to change the properties of the water mixture. Some chemicals, when added to water, tend to decrease the freezing temperature of water. Other chemicals tend to change the density of water. It may be desirable to add a chemical such as sodium nitrate to lower the freezing temperature of the water in the tank. This in turn may allow colder water to be delivered to the air chiller. As used herein, the term "water" refers to pure water or an aqueous mixture including any additives.

The charge and discharge cycles will now be described with reference to FIG. 1. The average temperature of the chilling water 16 in the tank 18 is preferably lowered or raised during separate cycles. During the water chilling or "charge" cycle, the average temperature of the water in the tank is lowered by introducing lower temperature chilling water 16a to the bottom of the tank 18b from the water chilling system 13. In an advantageous aspect of this invention, this charge cycle will typically be during the night-time or "off-peak" hours. At night, the ambient temperatures are generally lower, thereby largely eliminating the need to chill the inlet air 15a, 15b. Further, at night there is usually less demand for the power being produced by the power turbine. Therefore, at night, the water can be chilled using excess energy from the gas turbine system or power grid. Less electricity is required for primary power usage, and less expensive parasitic power is available for running the mechanical chiller 24. Also, more heat from the exhaust gas or steam may be available for running the absorption chiller 26 since less steam may be required by the steam turbine or cogeneration host during these "off-peak" night time hours. The charge cycle may, however, be performed at any time that proves advantageous to the particular operating conditions of the gas turbine system. Generally, the charge cycle should be performed when the need for useful power from the gas turbine system is at a minimum, i.e. off-peak periods, while the discharge cycle should be performed when the need for useful power is at a maximum, i.e. on-peak periods. As indicated above, after the charge cycle, the chilling water in the entire tank is preferably at a temperature of about 34° F. (about 1° C. to about 2° C.) to about 40° F. (about 4° C. to about 5° C.) unless additives are added to reduce the freezing point in which case even lower temperatures could be used. During the charge cycle, warm water 16e is pulled from the top 18a of the tank 18 and pumped through the water chilling system 13. Chilled water 16a is introduced back to the bottom portion 18b of the tank 18. The water level in the tank 18 does not change, only the proportion of warm water 16e to chilled water 16a changes as the tank becomes progressively chilled. Preferably, by the end of the charge cycle, the average temperature of the water in the tank is about 33° F. (about 0° C. to about 1° C.) to a range of from about 35° F. (about 1° C. to about 2° C.) to about 40° F. (about 4° C. to about 5° C.).

During the "discharge" cycle, all of the water chillers (e.g., chillers 24, 26) may be turned off, so that all the chilled water requirements for the air chilling coil 14 may be supplied by the tank 18. Advantageously, the discharge cycle occurs during peak power usage times (e.g., during the day), when parasitic power is most costly and/or an insufficient amount of waste heat from the exhaust gas 45 or steam may be available, e.g., to chill the water. As used herein, "daytime" refers to the period of time between sunrise and sunset. At this point, the storage tank 18 feature and the stored chilled water 16 in the tank 18 become particularly advantageous. Preferably, sufficient chilled water 16 is stored in the tank to last for the entire "discharge" cycle, with the option to have the water chilling system 13 supplement the stored chilled water 16 with directly chilled water as needed. Preferably, the amount of water discharged during the discharge cycle is less than the total volume of water stored in the tank 18. As before, chilling water 16b is removed from the bottom portion 18a of the tank 18, through bottom inlet/outlet 22. The chilling water 16b then passes on towards the air chiller 14. (An optional additional mechanical chiller 30 can be provided to further cool the chilled water 16b and introduce further chilled water 16c to the air chiller 14) The chilling water 16c then cools the inlet air in the air chiller 14 (e.g., a conventional air coiling coil), which produces higher temperature chilling water 16d. This higher temperature chilling water 16d is returned to the top portion 18a of tank 18. Because the higher temperature water 16d is being added to the tank 18, the average temperature of the water in the tank is increased (e.g., to a range of from about 60 (about 16° C.) °F. to about 70° F. (about 21° C.)). However, by virtue of the temperature gradient within the tank, and the stratified nature of the water therein (as discussed above), the higher temperature water occupies the upper portion 18a of the tank 18, leaving the lower temperature water in the lower portion 18b of the tank 18, which is being discharged through outlet 22 to pass to the air chiller 14. Eventually, over time, the line (the thermocline) between higher and lower temperature water gets lower and lower in the tank, i.e., it approaches the bottom of the tank. Preferably, however, if the tank 18 is large enough, before that line reaches the outlet 22 of the tank 18, the "charge" cycle is initiated, whereupon the water chillers (24, 26) are activated, introducing new chilled chilling water 16a to the tank. That new lower temperature chilling water then begins to fill up the bottom portion 18a of the tank 18. In one embodiment, it may be preferable to initiate the charge cycle before the average temperature in the tank reaches about 36° F. (about 2° C. to about 3° C.).

As indicated in FIG. 1, a number of different types of water chillers can be provided, at different locations, depending on design needs. For example, various mechanical chillers 24, 30 can be provided. Preferably, an upstream chiller is provided and whenever recovered GT exhaust heat is available, this upstream chiller is preferably an absorption chiller driven by either steam 44 from the HRSG 38 and/or steam from the back pressure steam 46 from the steam turbine 40 exhaust or hot water or steam 48 from an optional heat recovery coil 42. The use of absorption chillers to pre-chill the highest temperature water returning from the air cooling coil or tank is preferred, so long as a low grade heat source is available. This reduces the parasitic power required and improves the heat rate (efficiency) of the gas turbine by utilizing what would otherwise be "waste heat" energy. By combining the use of the chilled water storage tank 18 with absorption chillers, the amount of heat required can be made constant throughout a 24-hour day, even though the demand for chilled water may vary greatly between daytime and night-time.

Figure 2:
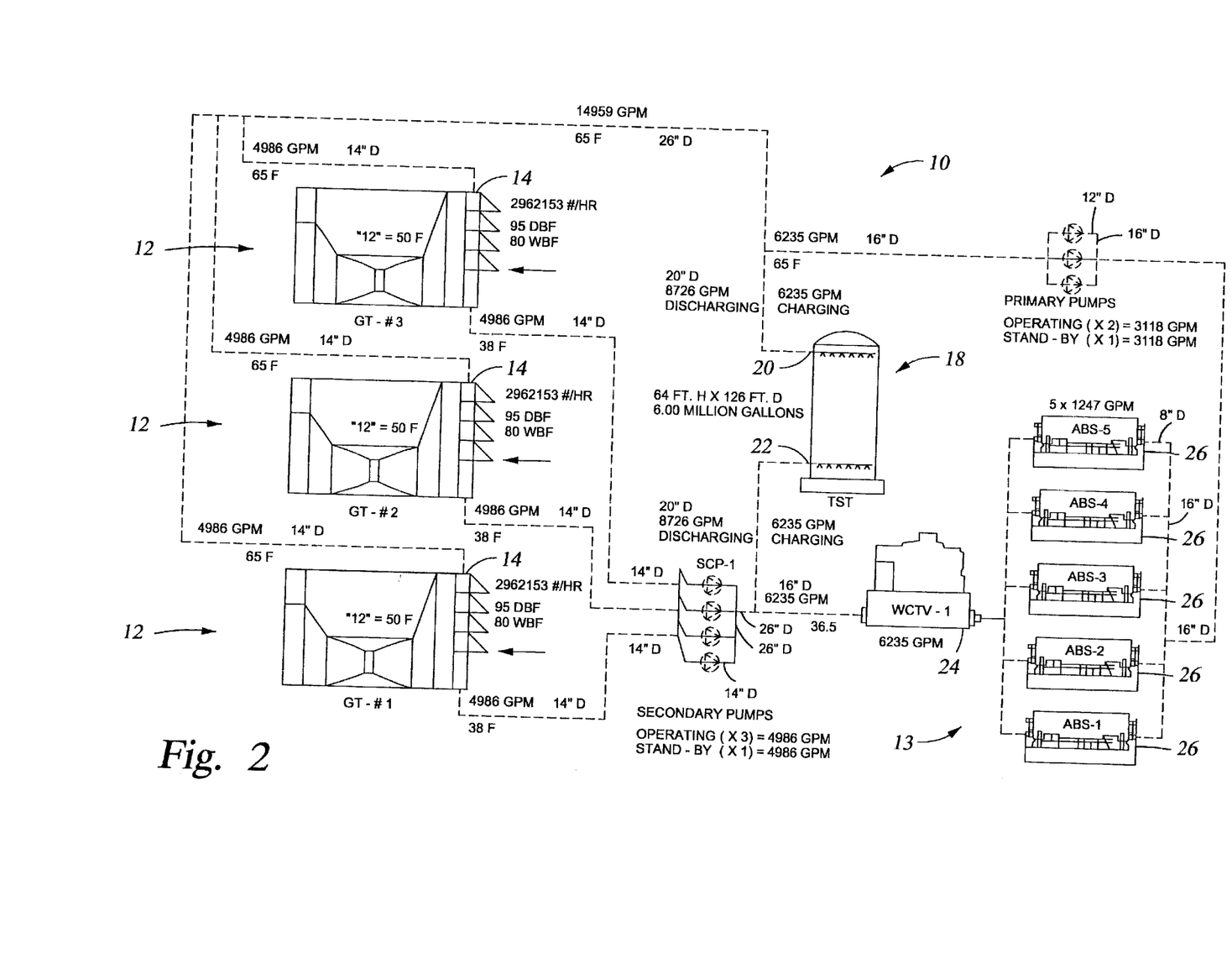
FIG. 2 is a schematic diagram of an alternative embodiment of the turbine inlet air cooling system of the present invention.

Now, with reference to FIG. 2, a preferred embodiment of the method and apparatus of the present invention will be discussed. In this embodiment, multiple conventional gas turbine systems 12 are provided. Each gas turbine system 12 has an air chiller 14. One tank 18 is shown, however it may be desirable to use multiple tanks 18 depending upon the configuration of the plot space available. The inventor has found a preferred relationship between the amount of cooling required by the gas turbines and the volume of water that should be stored in the tank(s) 18. This relationship is as follows:

$$\frac{(P \times C)}{\Delta T} = \text{volume}$$

Where: P=the total amount of cooling required to reduce the temperature of the inlet air to the gas turbines 12, expressed in ton hours (each ton hour=12,000 BTU); ΔT=the difference in temperature of the water 16c and 16d across the air chiller 14, expressed in °F.; C=a constant expressed in (°F*gallons)/(ton*hours); and volume=the total volume of stored water required in gallons. The constant C is a number that is determined according to various required tank design parameters, such as the required height of the tank, the ΔT of the water and the diffuser design. C may be in the range of about 1600 to about 1750; preferably C is in the range of about 1700 to about 1725; for example, C may be about 1720.

Depending upon the space requirements or soil conditions of any given installation, it may be preferable to employ several small tanks 18, or one larger tank 18. The design choice also depends upon the type of foundation chosen to hold the tank 18. Preferably, a ring-wall foundation is used, as shown in FIG. 3. In an embodiment with several tanks 18, each tank preferably has a bottom inlet/outlet 22 and a top inlet/outlet 20 and would preferably operate in much the same manner as previously described. Generally, tank volume requirements range from 800,000 gallons to 10 million gallons. Tank heights range from 25 feet to 70 feet. Tank diameters range from 50 feet to 250 feet. Normally, the tank diameter is greater than its height. Sometimes, it is preferred to have charge/discharge cycles that are relatively short in duration. For example, it may be more economical to employ a tank 18 that is only large enough to hold a volume of water for a discharge cycle lasting 4 or more hours. It also may be preferred to have a larger tank to hold a volume of water for an 8 or a 12 or more hour discharge cycle. Although generally for these longer peak periods the tank would supplement the chillers in a "partial storage" operation to maximize the available on-peak cooling hours with a given tank size. Generally, tank volumes range from 800 thousand gallons to 10 million gallons, but again, the volume of the tank is related to the ton-hours of cooling required to meet the desired entering air temperature of the power turbine which is a function of the ambient air enthalpy, the design chilled turbine inlet temperature, the airflow rate of the particular GT, the number of GT's, and the number of hours/day the storage system is to provide chilling.

I claim:

1. A method of chilling inlet air to a gas turbine power plant, comprising:
   a. providing a gas turbine power plant that includes at least one gas turbine and at least one compressor, and having a gas turbine inlet which receives inlet air;
   b. providing a system of circulating liquid chilling water including a chilling system that includes a first mechanical chiller and a second mechanical chiller, the first and second mechanical chillers being arranged in series;
   c. passing at least a portion of the liquid chilling water through the first mechanical chiller and the second mechanical chiller, the liquid chilling water passing through the first mechanical chiller being lowered to a first temperature, and the liquid chilling water passing through the second mechanical chiller being lowered to a second temperature that is lower than the first temperature, thus providing a staged liquid chilling water temperature drop, wherein the staged liquid chilling water temperature drop is from about 20° F. to about 34° F.;
   d. providing an inlet air chiller, comprising a cooling coil through which liquid chilling water passes, for lowering the temperature of inlet air being fed to the compressor through heat transfer between the liquid chilling water passing through the cooling coil and the inlet air, wherein the inlet air chiller provides a liquid chilling water temperature rise of from about 20° F. to about 34° F.; and
   e. chilling the inlet air by directing the liquid chilling water to the inlet air chiller and passing the liquid chilling water through the cooling coil of the inlet air chiller to make heat transfer contact between the liquid chilling water and the inlet air.

2. The method of claim 1, additionally comprising providing a thermal water storage tank and passing a portion of the liquid chilling water, having the second temperature, to the thermal water storage tank.

3. The method of claim 1, additionally comprising passing the circulating liquid chilling water through a third mechanical chiller after passing the liquid chilling water through the first and second mechanical chillers, prior to passing the liquid chilling water through the cooling coil.

4. The method of claim 1, wherein the liquid chilling water passing through the first mechanical chiller is lowered from a high temperature of about 54° F. to about 65° F. to a low temperature of about 40° F. to about 48° F.

5. The method of claim 1, wherein the liquid chilling water passing through the first mechanical chiller is lowered from a high temperature of about 54° F. to about 65° F. to a low temperature of about 40° F. to about 48° F. and the liquid chilling water passing through the second mechanical chiller is lowered from a high temperature of about 40° F. to 48° F. to a low temperature of about 34° F. to about 40° F.

6. The method of claim 1, wherein passing the liquid chilling water through the cooling coil of the inlet air chiller includes passing liquid water through a single cooling coil to chill the inlet air temperature to a second inlet air temperature that is lower than the first temperature.

7. The method of claim 1, wherein the inlet air is lowered from a high temperature of about 80° F. to about 155° F. to a low temperature of about 45° F. to about 55° F.

8. The method of claim 1, wherein passing the liquid chilling water through the cooling coil of the inlet air chiller includes passing liquid water through a multi-pass cooling coil to chill the inlet air from a first inlet air temperature to a second inlet air temperature that is lower than the first inlet air temperature.

9. The method of claim 1, wherein passing the liquid chilling water through the cooling coil of the inlet air chiller includes passing liquid water through a multi-pass cooling coil to chill the inlet air from a first inlet air temperature to a second inlet air temperature that is lower than the first inlet air temperature, the multi-pass cooling coil having four passes.

10. A method of chilling inlet air to a gas turbine power plant, comprising:
   a. providing a gas turbine power plant that includes at least one gas turbine and at least one compressor, and having a gas turbine inlet which receives inlet air;
   b. providing a system of circulating liquid chilling water including a chilling system that includes a first mechanical chiller, a second mechanical chiller, and a third mechanical chiller, the first, second, and third mechanical chillers being arranged in series;
   c. passing at least a portion of the liquid chilling water through the first mechanical chiller, the second mechanical chiller, and the third mechanical chiller, the liquid chilling water passing through the first mechanical chiller being lowered to a first temperature, the liquid chilling water passing through the second mechanical chiller being lowered to a second temperature that is lower than the first temperature, and the liquid chilling water passing through the third mechanical chiller being lowered to a third temperature that is lower than the second temperature, thus providing a staged liquid chilling water temperature drop, wherein the staged liquid chilling water temperature drop is up to about 34° F.;

d. providing an inlet air chiller, comprising a cooling coil through which liquid chilling water passed, for lowering the temperature of inlet air being fed to the compressor through heat transfer between the liquid chilling water passing through the cooling coil and the inlet air, wherein the inlet air chiller provides a liquid chilling water temperature rise of up to about 34° F.; and e. chilling the inlet air by directing the liquid chilling water to the inlet air chiller and passing the liquid chilling water through the cooling coil of the inlet air chiller to make heat transfer contact between the liquid chilling water and the inlet air.

11. The method of claim 10, wherein chilling air to the gas turbine includes first passing liquid chilling water through a first mechanical chiller and thereafter passing liquid chilling water through a second mechanical chiller; thereafter passing the liquid chilling water through the cooling coil of the inlet air chiller and recycling the liquid chilling water to the first mechanical chiller.

* * * * *

UNITED STATES PATENT AND TRADEMARK OFFICE
CERTIFICATE OF CORRECTION

PATENT NO.     : 6,470,686 B2                                                    Page 1 of 1
DATED          : October 29, 2002
INVENTOR(S)    : Tom L. Pierson It is certified that error appears in the above-identified patent and that said Letters Patent is hereby corrected as shown below:

Column 1,
Line 51, please change "turbines power" to -- turbine's power --.

Column 5,
Line 38, please change "including" to -- include --.

Column 12,
Line 6, please change "coiling coil" to -- cooling coil --.

Column 14,
Line 34, please change "chill the inlet air temperature" to -- chill the inlet air from a first inlet air temperature --.
Line 37, please change "155º F." to -- 115º F. --.

Column 15,
Line 8, please change "passed" to -- passes --.

Signed and Sealed this

Twenty-fifth Day of March, 2003

JAMES E. ROGAN
*Director of the United States Patent and Trademark Office*